R. H. PURNELL.
COTTON CHOPPER AND CULTIVATOR.
APPLICATION FILED SEPT. 10, 1907.
903,001.
Patented Nov. 3, 1908.
3 SHEETS—SHEET 1.
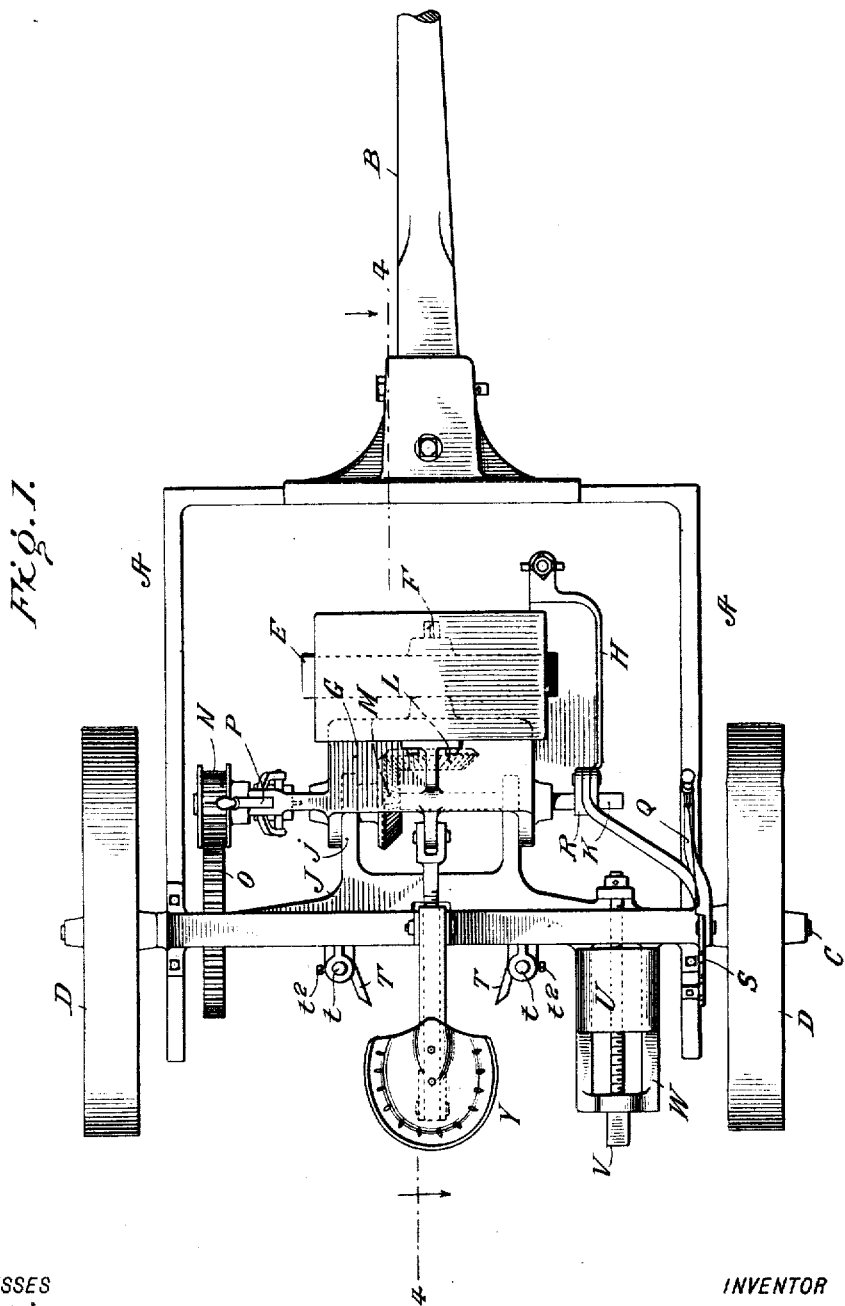
WITNESSES
INVENTOR
R. H. Purnell,
BY
ATTORNEYS

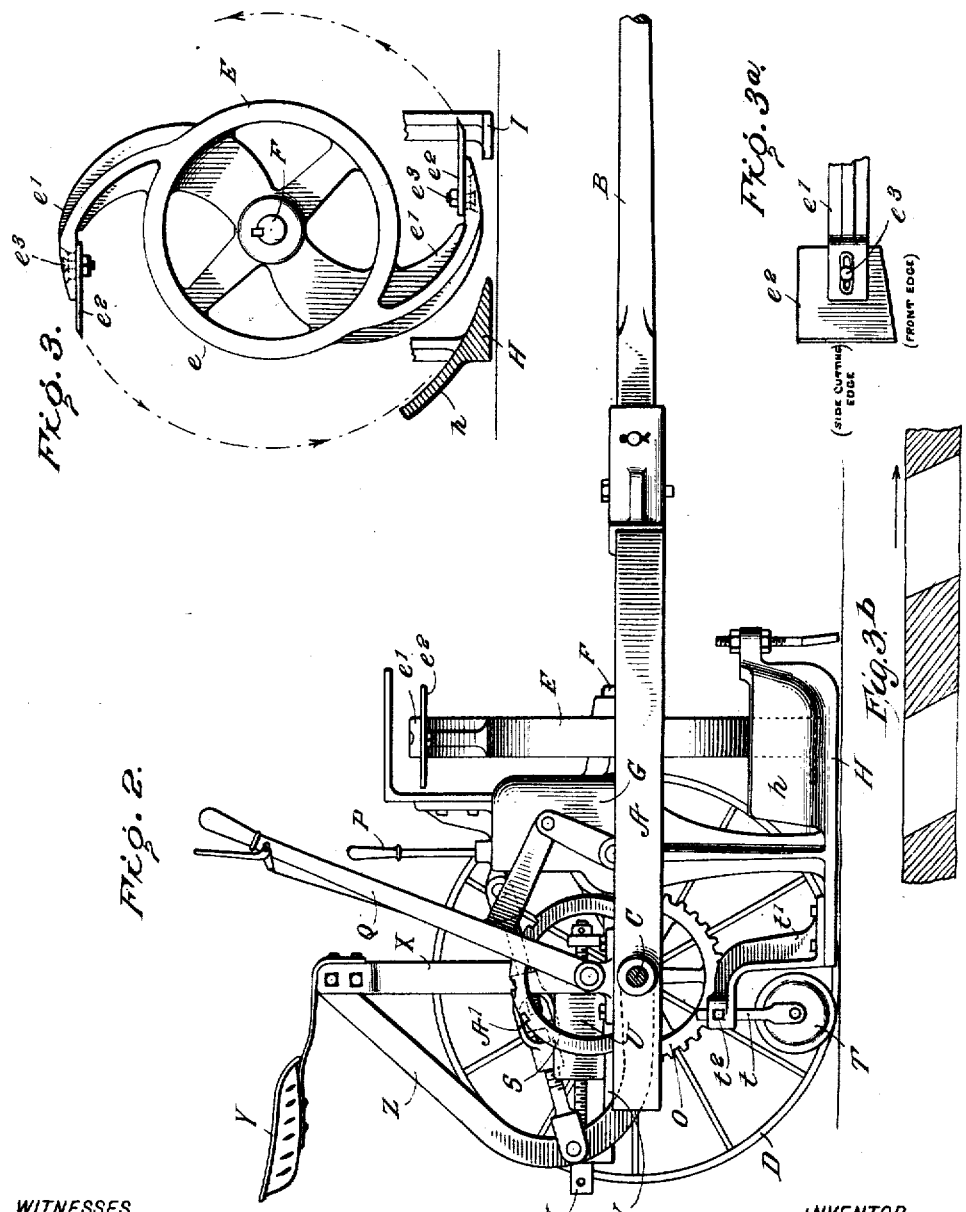

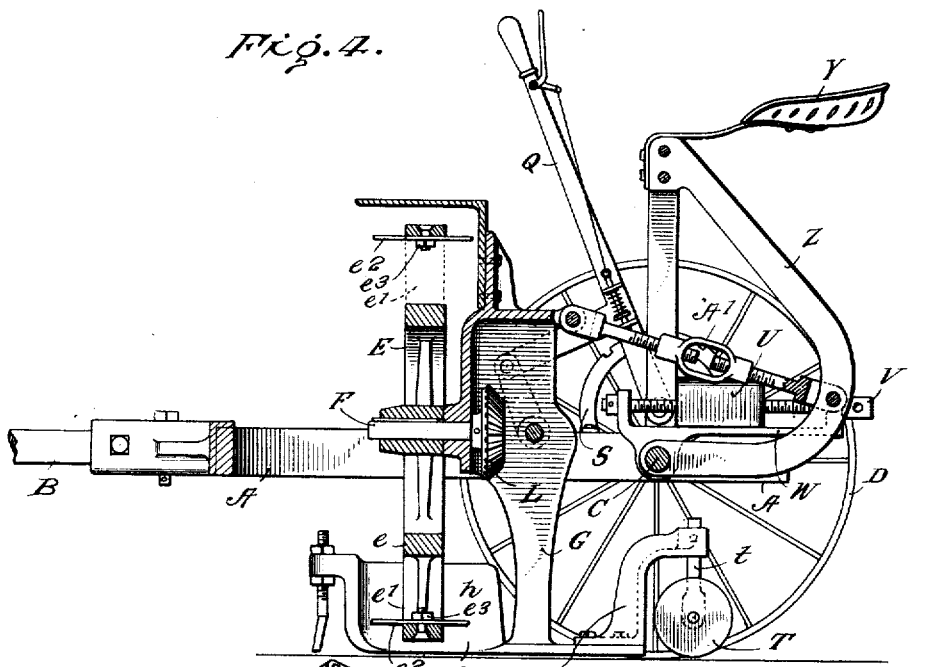
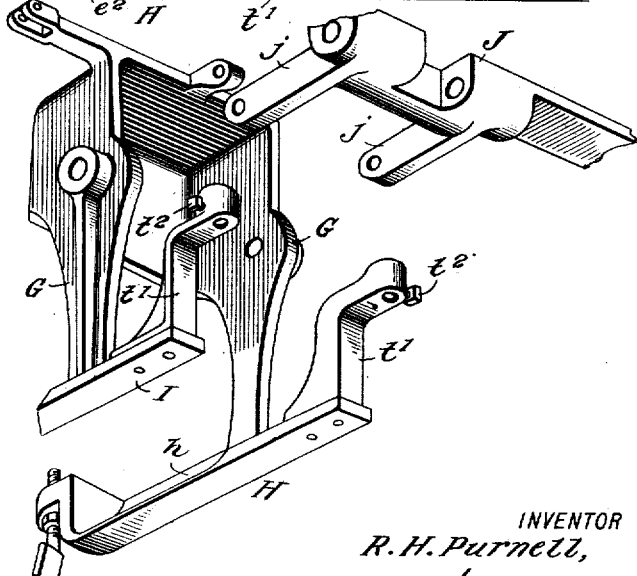

UNITED STATES PATENT OFFICE.

RICHARD HOPE PURNELL, OF ROSEDALE, MISSISSIPPI.

COTTON CHOPPER AND CULTIVATOR.

No. 903,001.      Specification of Letters Patent.      Patented Nov. 3, 1908.

Application filed September 10, 1907. Serial No. 392,085.

*To all whom it may concern:*

Be it known that I, RICHARD HOPE PURNELL, a citizen of the United States, and a resident of Rosedale, in the county of Bolivar and State of Mississippi, have invented an Improvement in Cotton Choppers and Cultivators, of which the following is a specification.

My invention is an improvement upon the machine for which I have obtained Letters Patent No. 855,977, dated June 4, 1907.

In the present invention I have greatly reduced the size, weight and cost of the original machine and increased the general efficiency.

The special features embodying the invention are as hereinafter described and claimed, and illustrated in the accompanying drawings, in which Figure 1 is a plan view of the machine: Fig. 2 is a side elevation of the same: Fig. 3 is a vertical cross section taken just in front of the revolving hoe or chopper: Fig. 3$^a$ is a plan view of one of the hoes or cutting blades proper together with a portion of the arm to which it is secured: Fig. 3$^b$ is a diagram illustrating the direction of the cuts made in a row of cotton: Fig. 4 is a vertical longitudinal section on the line 4—4 of Fig. 1: Fig. 5 is a perspective view of the pivoted frame to which the runners are attached.

The frame A, provided with a tongue B, is mounted and journaled on the axle C, and in consequence of the construction of other parts is made much shorter and lighter than in my previous machine. The running wheels D are in practice keyed on the axle, or one of them is so keyed and the other operatively connected with the axle by means of a ratchet and pawl as is usual in various agricultural machines.

The revolving hoe or chopper E—see Figs. 2, 3, 4—is keyed upon a shaft F journaled in a frame G provided with runners H and I— see especially Fig. 5. This frame G is journaled in arms $g$ of a supplemental frame J— see Figs. 1 and 5—which is in turn journaled on the axle C. The arms $j$ are parallel and extend forward so as to embrace the sides of the hoe-carrier frame E. A shaft K passes through these parts and serves as a means of articulation of the same. The shaft F upon which the hub of the hoe or chopper E is mounted is provided on its inner end with a bevel gear L which, as shown in Fig. 1, meshes with a corresponding gear M keyed on the transverse shaft K. A spur pinion N—see Fig. 1—is mounted loose on one end of the shaft K and meshes with a spur gear O keyed upon the adjacent portion of the axle. It is apparent that by this arrangement and combination of parts, as the machine advances, the axle being thereby rotated, the shaft K is driven and rotation is thereby imparted to the hoe or chopper E. In the original machine before referred to, the main frame A required to be made much longer than in the present invention in view of the provision of sprocket gearing for operatively connecting the revolving axle with the shaft driving the revolving hoe; but I have now dispensed with the sprocket gearing and thus shortened the frame A and thereby greatly reduced the number of parts and weight, and cost of the machine, the axle being geared directly with the shaft K that operates the revolving hoe without any intermediary or accessory.

A lever P—see Fig. 1—is arranged to operate a clutch mounted on the shaft K for locking the pinion $k$ with the shaft or disengaging it therefrom as required. For the purpose of raising or lowering the hoe-carrying frame G, as required to place it in position for operation of the hoe on the cotton row, or to hold it elevated as when the machine is being hauled from one place to another, or is out of action, a hand lever Q is connected by jointed arms R with the shaft K and provided with means for locking it to a segmental rack S fixed on one of the side bars of frame A.

The revolving hoe E—see Fig. 3—comprises an enlarged circular hub $e$ that serves as a fly, or balance, wheel, having opposite curved arms $e'$. The hoes $e^2$ are secured adjustably to the ends of the arms $e'$ by means of clamp-screws $e^3$ which pass through longitudinal slots in the said arms. By means of this attachment the hoes or cutters $e^2$ may be projected more or less as conditions require. The machine travels two inches while the revolving hoe cuts across a space of eight inches, and through the cotton row. Consequently the cuts made are inclined to the direction of the row, as shown by diagram in Fig. 3$^b$. In order to prevent the hoes or cutters proper $e^2$ from dragging these two inches, and in order to give them a clean cut, the front edges of the same are sloped or inclined rearward from the front outer corner to the front inner corner, as will be apparent upon inspection of Fig. 3ª.

A special feature of my invention is the construction of the right-hand runner H, this being, as shown in Figs. 2, 3, 4, provided with an upwardly and laterally extending portion $h$, which serves as a lateral guard for the revolving hoe preventing stubble, weeds, or trash of any kind from being drawn inward by the hoe in its revolutions, whereby the latter would become clogged and its work rendered imperfect. The guard $h$ is preferably formed integrally with the runner proper, it being a thin wing or plate extended vertically to a height considerably above the level of the blades when at the lowest point in their revolution.

Another feature of my invention is the provision of rotary bevel disks T, the same being journaled in a vertical rod $t$ which is held in a bracket $t'$ attached to the rear ends of the runners H, I. The rods $t$ are clamped at any required height by means of screws $t^2$. These disks may be set at various lateral inclinations, as will be understood by reference to Figs. 1 and 2; and in one position, that is to say, when inclined inward as in Fig. 1, they would serve to throw dirt towards the row of cotton plants, whereas when arranged at the opposite inclination they would serve to scrape the sides of the cotton row.

As shown in Fig. 5, see also Fig. 4, the runner I is made much shorter than the runner H, the latter having a front upturned portion in consequence of the required function of the latter in overrunning stubble, weeds, etc. in the furrow.

For the purpose of balancing, or nearly so, the weight of the pivoted frame G and its attachments, I employ an adjustable weight U which is mounted upon a screw shaft V arranged longitudinally and held rotatably in the bracket W forming a rear extension of the pivoted supplemental frame J. The rear end of the screw is provided with a head whereby it may be rotated for adjusting the weight towards or from the axle of the machine, as required to effect the desired balance of the pivoted parts in front of the axle.

As before indicated, the lever Q serves to raise and lower the hoe-carrying frame, but for the purpose of controlling the pitch of the said frame I employ an adjustable connection between said frame and the main frame A of the machine, that is to say, the height of the neck yoke attached to the tongue B and consequently the horizontal inclination of the frame A will depend in part upon the size of the animals constituting the team attached to the machine.

It is obvious that the vertical inclination of the revolving hoe or chopper E corresponds invariably to the horizontal inclination of the frame, and it therefore becomes necessary to provide means for adjusting the frame carrying the hoe so that it shall be held vertical; otherwise the hoes would not act properly in chopping or cutting out the row of cotton plants. The frame A has upwardly extended arms X upon whose meeting ends the driver's seat Y is attached. A downwardly curved arm or bar Z connects the upper ends of arms X with the axle. Between the rear curved portion of the bar Z and the frame G carrying the runners H, I, and the revolving hoe E is an adjustable connection A' consisting of a turn-buckle—see especially Fig. 4—and screw-threaded rods which it connects. It is obvious that by adjusting, that is rotating, the turn-buckle, the distance between the bar Z and the frame G will be increased or lessened and that thereby the frame G may be adjusted on the shaft K so as to set it and maintain it in vertical position.

What I claim is:

1. The improved cotton chopper, comprising a main frame having a tongue attached, an axle on which it is journaled, running wheels keyed on the axle, a revolving hoe, a frame in which it is mounted, and a supplemental frame mounted on the axle, a shaft which forms the pivotal connection between the hoe-carrying frame and supplemental frame, gearing which operatively connects said shaft with the revolving hoe, and spur gearing operatively connecting the shaft directly with the axle, substantially as described.

2. The improved cotton-chopper comprising a main frame, an axle arranged transversely therein and wheels applied to said axle, a revolving hoe or chopper comprising blades and a frame having radial arms to which said blades are attached, the blades having their cutting edges inclined from the front outer corner rearward and as shown and described.

3. In a machine of the type indicated, the combination with a main frame, a supplemental frame journaled therein and a revolving hoe arranged vertically and transversely of the frame, the supplemental frame being provided with runners, one of which has a vertical guard $h$ consisting of a plate extending vertically to a height above the level at which the blades of the hoe act upon the cotton row, as shown and described.

4. In a machine of the type indicated, the combination with the main frame and the wheeled axle upon which the same is mounted, of a hoe-carrying frame pivotally connected with the axle and arranged in front thereof, and means connecting the rear portion of the main frame with such pivoted frame whereby the vertical inclination of the latter may be adjusted as required.

5. The combination with the main frame and the wheeled support therefor, such frame having a rigid rear extension, of a hoe-carrying frame arranged within the main frame and pivoted in front of the axle, and a turnbuckle and threaded rods connected therewith, such parts constituting means for connecting the upper end of the hoe-carrying frame with the rear portion of the main frame whereby the vertical inclination of the hoe-carrying frame may be adjusted at will, substantially as described.

RICHARD HOPE PURNELL.

Witnesses:
 STANLEY DYCHES,
 ROY CHURCH.